March 24, 1970 R. D. BIZOE 3,502,917
ELECTRIC MOTOR WITH STRAIN RELIEF CONNECTOR
Filed Nov. 30, 1967 2 Sheets-Sheet 1
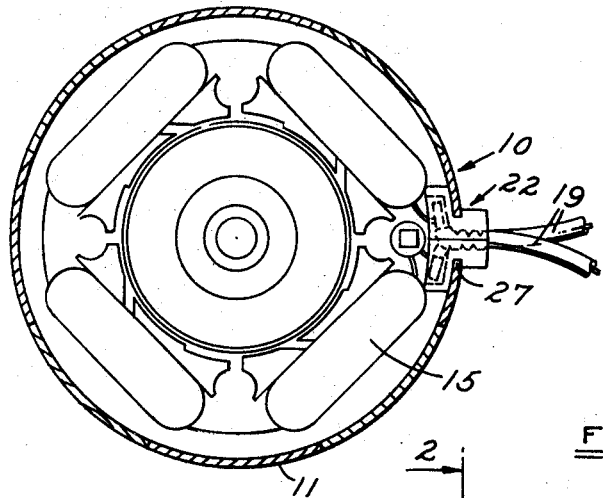
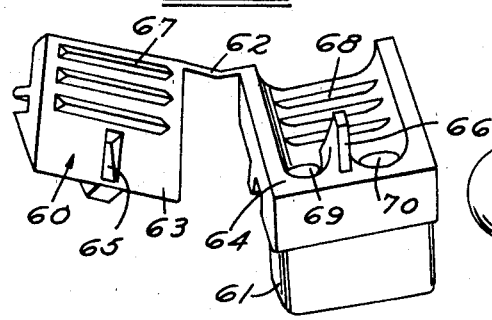
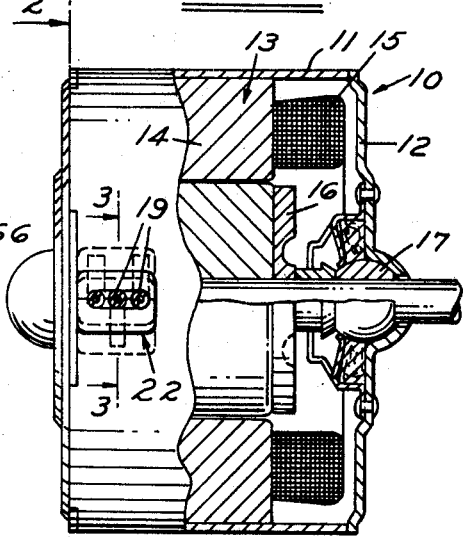
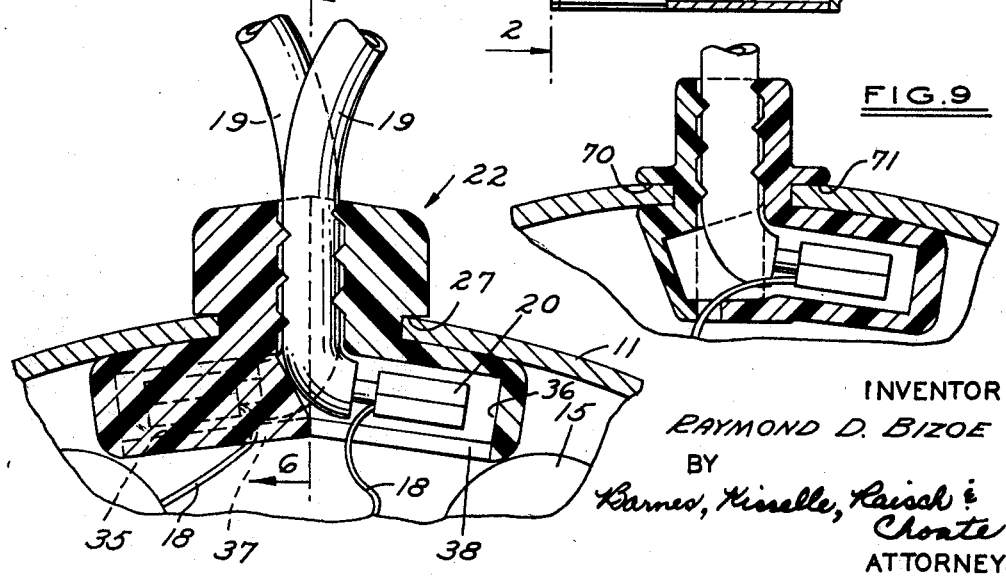
INVENTOR
RAYMOND D. BIZOE
BY
Barnes, Kisselle, Raisch & Choate
ATTORNEYS March 24, 1970 R. D. BIZOE 3,502,917
ELECTRIC MOTOR WITH STRAIN RELIEF CONNECTOR
Filed Nov. 30, 1967 2 Sheets-Sheet 2

INVENTOR
RAYMOND D. BIZOE
BY
Barnes, Kisselle, Raisch & Choate
ATTORNEYS

United States Patent Office 3,502,917
Patented Mar. 24, 1970

3,502,917
ELECTRIC MOTOR WITH STRAIN RELIEF CONNECTOR
Raymond D. Bizoe, Corunna, Mich., assignor, by mesne assignments, to Universal Electric Company, Owosso, Mich., a corporation of Delaware
Filed Nov. 30, 1967, Ser. No. 687,045
Int. Cl. H02k 11/00
U.S. Cl. 310—71         14 Claims

ABSTRACT OF THE DISCLOSURE

The electric motor disclosed herein comprises a sheet metal casing which supports a stator and a rotor. The sheet metal casing includes a cylinder that has an open ended slot in one end thereof. A strain relief connector made of plastic has spaced grooves engaging the sides of said slot. The sections of the strain relief connector have oppositely disposed abutting faces and cavities which receive the lead wires. The sections are formed with interengaging projections at the bases of the cavities for gripping the lead wires. The sections also have junction receiving cavities. One end of each lead wire is connected by a suitable junction such as a clip with a magnet wire extending from the stator. Each junction is received in a cavity in one of the body sections.

BACKGROUND OF THE INVENTION

In the manufacture of electric motors it is common to provide a heavier insulated lead wire that extends to and is connected to the lighter magnet wires of the stator of the motor. The connections between the lead wires and the magnet wires are commonly made by twisting the wires together and welding, soldering or mechanically splicing by a band of metal. The resultant connection or junction is electrically insulated and commonly disposed among the stator windings to protect the connection from breakage or damage of the insulation. A common practice is to insulate the junction by tape or an insulating sleeve and then place the junction in an open space formed by the iron core and two adjacent coils of the stator by wedging the junction in place with pieces of insulating materials.

This method of protecting the junction is very costly and has the further disadvantage in that it is dependent upon placement in a space between adjacent coils the size of which are not constant so that in assembly it is necessary to utilize varying amounts of material to wedge the junction in place. A further disadvantage is that by utilizing the space between adjacent coils, the flow of air between the coils is obstructed so that normal circulation and cooling of the coils by such air is prevented resulting in a higher temperature of operation of the coils.

It is also common to utilize some sort of strain relief device which clamps the lead wires to the casing of the motor so that any force upon the lead wires will not be transmitted to the junction or to the magnet wires.

Among the objects of the invention are to provide a combined strain relief and junction structure which obviates the disadvantages of the prior art; which is relatively simple; which is low in cost; which requires a minimum of labor to assemble; and which improves the overall efficiency of the motor.

DESCRIPTION OF THE DRAWINGS

FIG. 1 is a part sectional side elevational view of a motor embodying the invention.

FIG. 2 is a sectional view taken along the line 2—2 in FIG. 1.

FIG. 3 is a fragmentary sectional view on an enlarged scale taken along the line 3—3 in FIG. 1.

FIG. 9 is a sectional view of a further modified form of the invention.

FIG. 10 is a perspective view of the form of the invention shown in FIG. 9.

DESCRIPTION

Figure 4:
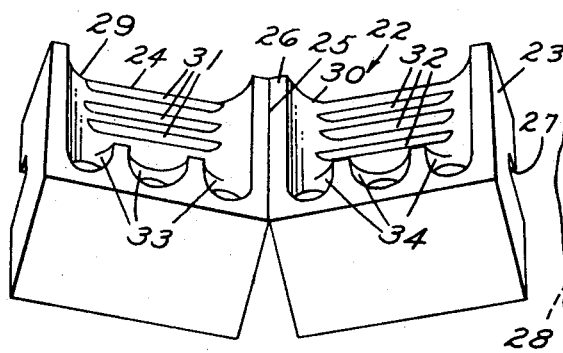
FIG. 4 is a perspective view of the strain relief connector embodying the invention.

Referring to FIG. 1, the motor 10 embodying the invention comprises a cylindrical sheet metal casing 11 having sheet metal end members 12 fixed thereon. A stator 13 comprising a core 14 and coils 15 is mounted within the casing 11. A rotor 16 is rotatably mounted within the end members 12 by bearings 17.

As shown in FIG. 3 the coils 15 have magnet wires 18 that are connected to heavier insulated lead wires 19. Specifically the magnet wires 18 are gathered together about the wires 19 and a metal sleeve 20 is clamped over the twisted connection to form a junction.

Figure 5:
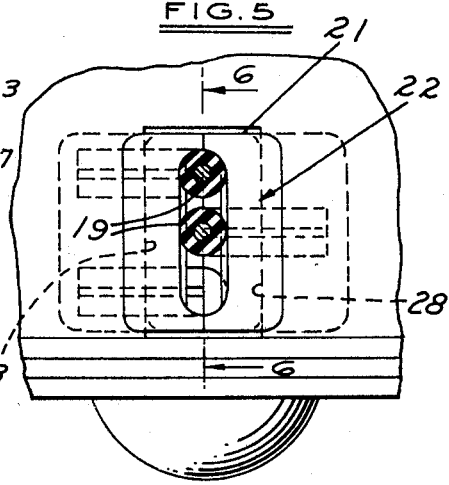
FIG. 5 is a fragmentary top plan view of a portion of the device shown in FIG. 1.

As shown in FIG. 5 the casing 11 is formed with an open ended slot 21 in one end thereof and a strain relief connector 22 is received within the slot.

Specifically strain relief connector 22 comprises partible generally L-shaped body sections 23, 24 that are hinged to one another along one end edge 25. The body sections 23, 24 are made of insulating material such as plastic and more specifically such as nylon.

The body sections include abutting faces 26 and exterior straight grooves 27 that are parallel when the faces 26 are in abutment. With the faces 26 in abutment, the connector 22 can be slid into the slot 21 with the sides 28 of the slot 21 engaging the grooves 27.

Figure 6:
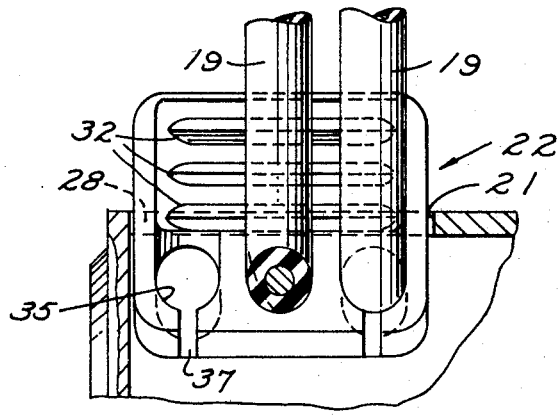
FIG. 6 is a fragmentary sectional view taken along the line 6—6 in FIG. 5.

As shown in FIGS. 4–6, each body section 23, 24 has an upwardly opening recess 29, 30 in its abutting face. The base of each recess has parallel projections 31, 32 that are vertically spaced relative to one another to define alternate ridges and valleys. The projections on opposite sections are vertically staggered as viewed in FIG. 3. When the faces 26 are brought into abutment the ridges 31, 32 extend inwardly to grip the lead wires 19 as shown in FIG. 3.

The abutting faces 26 further include channels 33, 34 that extend to cavities 35, 36 in the respective body sections 23, 24. Specifically the cavities 35, 36 have longitudinal axes that form an angle with the abutting faces of the respective body sections. The cavities 35, 36 are adapted to receive the junctions 20 and thereby insulate and protect the junctions. Each body section 23, 24 further includes slots 37, 38 that open downwardly and provide passages for the lead wires 19.

In the assembly of the motor, the junctions 20 are first formed and then placed in cavities 35, 36. The connector sections 23, 24 are then swung toward one another to bring the faces 26 into abutment and to grip the lead wires 19. The connector is then inserted into the slot 21 to hold the lead wires in gripping relation.

Figure 7:
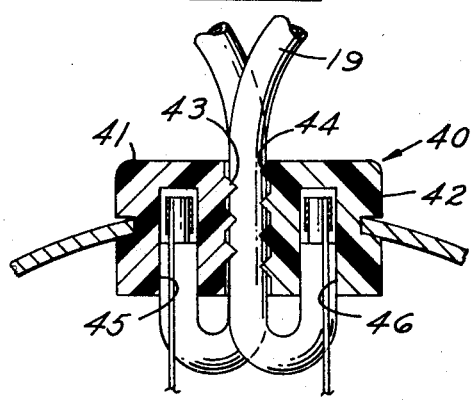
FIG. 7 is a sectional view similar to FIG. 3 of a modified form of the invention.

In the form of the invention shown in FIG. 7, the connector 40 comprises sections 41, 42 which have abutting faces formed with oppositely disposed vertically staggered ribs 43, 44 for gripping the lead wires 19. In this form the junction receiving cavities 45, 46 have their axes ex- 3,502,917

3 tending parallel to the abutting faces of the body sections 41, 42.

Figure 8:
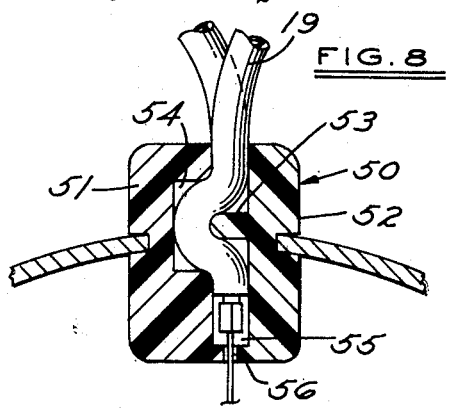
FIG. 8 is a sectional view of a further modified form of the invention.

In the form of the invention shown in FIG. 8, the connector 50 comprises body sections 51, 52. The abutting faces of the body sections 51, 52 have a single complementary projection 53 and cavity 54 for gripping the lead wires 19. In addition, the junction receiving cavity 55 is formed by facing cut-away portions in the abutting faces and the lead passage for the magnet wire is formed similarly by facing grooves 56 in the abutting faces.

In the form of the invention shown in FIGS. 9 and 10, the connector comprises body sections 60, 61 that are connected by an integral thin connecting member 62. The abutting faces 63, 64 have a single complementary cavity 65 and projection 66, respectively, that insure proper alignment and gripping of the wires by the vertically staggered ribs 67, 68. In this form, junction receiving cavities 69, 70 are provided only on the body section 61 with their axes extending substantially at right angles to the abutting faces 63, 64. As in the previous forms of the invention, each section 60, 61 includes casing receiving slots 70, 71.

I claim:

1. In an electric motor comprising a casing, a stator within said casing, and a rotor rotatably mounted in said casing within said stator, the combination comprising:
    a strain relief connector comprising partible body sections,
    said casing having a slot therein at one end thereof,
    said connector having spaced grooves therein engaging the sides of the slot,
    each of said body sections having complementary abutting surfaces,
    a lead wire,
    said body sections having recesses with complementary oppositely disposed projections engaging said lead wire,
    at least one of said sections having a junction receiving cavity adjacent the end of the lead wire,
    a magnet wire extending from said stator,
    means forming a junction between the end of said lead wire and the end of said magnet wire,
    said junction being received within said junction receiving cavity.

2. The combination set forth in claim 1 wherein said body section having said junction receiving cavity therein includes an access passage extending from said cavity to the exterior of said body section,
    said magnet wire extending through said passage.

3. The combination set forth in claim 1 wherein said junction receiving cavity has a longitudinal axis substantially parallel to the abutting face of said body section.

4. The combination set forth in claim 1 wherein said oppositely disposed complementary projections comprise substantially parallel ribs and grooves in the recesses of each of the body sections.

5. In an electric motor comprising a casing, a stator within said casing, and a rotor rotatably mounted in said casing within said stator, the combination comprising:
    a plastic strain relief connector comprising partible body sections hinged at one edge to one another,
    said casing having a slot therein at one end thereof,
    said body sections having spaced grooves therein engaging the sides of said slot,
    each of said sections having complementary abutting surfaces and complementary recesses in said surfaces for receiving lead wires,
    lead wires,
    said body sections having complementary oppositely disposed projections in said recesses for engaging said lead wires,
    said sections having a junction receiving cavity adjacent the ends of said lead wires,
    magnet wires extending from said stators,
    means forming a junction between the end of said lead wires and the end of said magnet wires,

4 said junctions being received within said cavities.

6. For use in an electric motor comprising a casing, a stator within said casing, and a rotor rotatably mounted in said casing within said stator, the combination comprising:
    a strain relief connector comprising partible body sections,
    said connector having spaced means therein adapted to engage an opening in the motor casing,
    each of said sections having complementary abutting surfaces and complementary recesses for receiving lead wires,
    said body sections having complementary oppositely disposed projections for engaging said lead wires,
    at least one of said sections having a junction receiving cavity therein.

7. The combination set forth in claim 6 wherein each said body section includes an access passage extending from said cavity to the exterior of said body section through which a magnet wire may extend.

8. The combination set forth in claim 6 wherein said junction receiving cavity has an axis substantially parallel to the abutting face of said body section.

9. The combination set forth in claim 6 wherein said oppositely disposed complementary projections comprise substantially parallel ribs and grooves in the recesses of each of the body sections.

10. For use in an electric motor comprising a casing, a stator within said casing, and a rotor rotatably mounted in said casing within said stator, the combination comprising:
    a plastic strain relief connector comprising partible body sections hinged to one another,
    said connector having spaced grooves therein adapted to engage the sides of said slot,
    each of said sections having complementary abutting surfaces and complementary recesses for receiving a lead wire,
    said body sections having complementary oppositely disposed projections for engaging lead wires,
    said sections having junction receiving cavities.

11. In an electric motor comprising a casing, a stator within said casing, and a rotor rotatably mounted in said casing within said stator, the combination comprising:
    a strain relief connector comprising partible body sections,
    said casing having a slot therein at one end thereof,
    said connector having spaced grooves therein engaging the sides of the slot,
    each of said body sections having complementary abutting surfaces,
    a lead wire,
    said body sections having recesses with complementary oppositely disposed projections for engaging said lead wire,
    at least one of said sections having a junction receiving cavity,
    a magnet wire extending from said stator,
    means forming a junction between the end of said lead wire and said magnet wire,
    said junction being received within said junction receiving cavity,
    said junction receiving cavity having a longitudinal axis forming an angle with the plane of said abutting face of said body section.

12. In an electric motor comprising a casing, a stator within said casing, and a rotor rotatably mounted in said casing within said stator, the combination comprising:
    a strain relief connector comprising partible body sections,
    said casing having a slot therein at one end thereof,
    said connector having spaced grooves therein engaging the sides of the slot,
    each of said body sections having complementary abutting surfaces,
    a lead wire, said body sections having recesses with complementary oppositely disposed projections for engaging said lead wire, at least one of said sections having a junction receiving cavity, a magnet wire extending from said stator, means forming a junction between the end of said lead wire and said magnet wire, said junction being received within said junction receiving cavity, said junction receiving cavity forming an angle with the abutting face of the body section, said body section having a channel in said abutting face providing a passage for said lead wire between said recess and said cavity.

13. For use in an electric motor comprising a casing, a stator within said casing, and a rotor rotatably mounted in said casing within said stator, the combination comprising:

a strain relief connector comprising partible body sections, said connector having spaced means therein adapted to engage an opening in the motor casing, each of said sections having complementary abutting surfaces and complementary recesses for receiving lead wires, said body sections having complementary oppositely disposed projections for engaging said lead wire, at least one of said sections having a junction receiving cavity therein, said junction receiving cavity having a longitudinal axis forming an angle with the plane of said abutting face of said body section.

14. For use in an electric motor comprising a casing, a stator within said casing, and a rotor rotatably mounted in said casing within said stator, the combination comprising:

a strain relief connector comprising partible body sections, said connector having spaced means therein adapted to engage an opening in the motor casing, each of said sections having complementary abutting surfaces and complementary recesses for receiving lead wires, said body sections having complementary oppositely disposed projections for engaging said lead wire, at least one of said sections having a junction receiving cavity therein.

said junction receiving cavity forming an angle with the abutting face of the body section, said body section having a channel in said abutting face providing communication between said recess and said cavity.

References Cited
UNITED STATES PATENTS

| | | | |
|---|---|---|---|
| 1,909,497 | 5/1933 | Nielsen | 310—71 |
| 2,673,968 | 3/1954 | Smith | 339—105 |
| 2,920,129 | 1/1960 | Rapata | 339—109 |
| 3,293,463 | 12/1966 | Church | 310—71 |
| 3,304,447 | 2/1967 | Lindt | 310—71 |

MILTON O. HIRSHFIELD, Primary Examiner

R. SKUDY, Assistant Examiner

U.S. Cl. X.R.

174—153.